(12) United States Patent
Attenberger et al.

(10) Patent No.: US 7,648,074 B2
(45) Date of Patent: Jan. 19, 2010

(54) ARTICLE, ESPECIALLY VALUABLE AND SECURITY DOCUMENT, COMPRISING A SECURITY FEATURE

(75) Inventors: Thomas Attenberger, Poing (DE); Wolfgang Deckenbach, Schechen (DE); Rainer Hoppe, Nuremberg (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/495,654

(22) PCT Filed: Nov. 19, 2002

(86) PCT No.: PCT/EP02/12959

§ 371 (c)(1),
(2), (4) Date: Oct. 12, 2004

(87) PCT Pub. No.: WO03/043830

PCT Pub. Date: May 30, 2003

(65) Prior Publication Data

US 2005/0051635 A1    Mar. 10, 2005

(30) Foreign Application Priority Data

Nov. 20, 2001 (DE) ................. 101 56 852

(51) Int. Cl.
*G06K 19/06* (2006.01)
(52) U.S. Cl. ............... 235/491; 430/1; 430/9; 369/109.01; 359/1; 359/35; 156/220; 428/323
(58) Field of Classification Search ......... 235/491, 235/468, 488; 430/1, 9; 369/109.01; 359/1, 359/35, 109.01; 156/220; 340/572.8; 427/7; 372/42; 428/323
See application file for complete search history.

(56) References Cited

U.S. PATENT DOCUMENTS

| | | | |
|---|---|---|---|
| 5,448,582 A | | 9/1995 | Lawandy |
| 5,605,649 A | * | 2/1997 | Stohrer et al. .......... 252/299.01 |
| 5,810,957 A | * | 9/1998 | Boswell .................... 156/220 |
| 5,903,340 A | | 5/1999 | Lawandy |
| 6,138,913 A | * | 10/2000 | Cyr et al. ................... 235/468 |
| 6,255,948 B1 | * | 7/2001 | Wolpert et al. ........... 340/572.8 |
| 6,377,367 B1 | * | 4/2002 | Suganuma .................... 359/1 |
| 6,379,742 B1 | * | 4/2002 | Behm et al. .................... 427/7 |
| 6,505,779 B1 | * | 1/2003 | Power et al. ............... 235/488 |
| 6,595,427 B1 | * | 7/2003 | Soni et al. ................. 235/491 |
| 2002/0018430 A1 | * | 2/2002 | Heckenkamp et al. . 369/109.01 |
| 2002/0126333 A1 | * | 9/2002 | Hosono et al. ............... 359/35 |
| 2003/0104206 A1 | * | 6/2003 | Argoitia et al. ............ 428/404 |
| 2003/0104309 A1 | * | 6/2003 | Koops et al. ............... 430/201 |
| 2003/0108074 A1 | * | 6/2003 | Lawandy .................... 372/42 |
| 2003/0165746 A1 | * | 9/2003 | Stadler et al. ................. 430/1 |
| 2004/0043308 A1 | * | 3/2004 | Lutz et al. ..................... 430/9 |
| 2004/0053140 A1 | * | 3/2004 | Stadler et al. ................. 430/1 |
| 2004/0101676 A1 | * | 5/2004 | Phillips et al. .............. 428/323 |
| 2004/0105963 A1 | * | 6/2004 | Bonkowski et al. ...... 428/195.1 |
| 2005/0012970 A1 | * | 1/2005 | Cox et al. .................... 359/1 |

\* cited by examiner

FOREIGN PATENT DOCUMENTS

DE    198 05 993 A    7/1999

*Primary Examiner*—Allyson N Trail
(74) *Attorney, Agent, or Firm*—Rothwell, Figg, Ernst & Manbeck, P.C.

(57) ABSTRACT

A value or security document (2) contains a security feature (4) in the form of a film laser with an emitter layer (12) and preferably a protective layer (14). A spatial, periodic modulation (8), preferably of the surface of a substrate, permits fine adjustment of a laser wavelength within a range of possible wavelengths. This permits a coding of the security feature by different portions of different wavelengths.

17 Claims, 2 Drawing Sheets x : OPTICAL ABSORBERS o : HALS

▫ : ANTIOXIDANTS

ARTICLE, ESPECIALLY VALUABLE AND
SECURITY DOCUMENT, COMPRISING A
SECURITY FEATURE

CROSS-REFERENCE TO RELATED APPLICATIONS

This application is a National Stage of International Application No. PCT/EP02/12959, filed Nov. 19, 2002.

FIELD OF THE INVENTION

This invention relates in general to an object, but in particular a value and security document, having a security feature. Without limiting the generality the following statements are to relate to a value and security document in the form of a bank note, it being clear to the expert that the statements relating to the security feature also apply to other objects to be secured, for example high-quality industrial products, spare parts, ICs and the like, as well as the packing thereof.

DESCRIPTION OF THE BACKGROUND ART

For checking the authenticity of bank notes (and other value and security documents as well as objects in general), security features are incorporated which are detectable, partly without special aids and partly with special equipment, for distinguishing authentic bank notes from forged bank notes. Examples of such security features or authenticity features are e.g. watermarks, security threads, holograms, Kinegrams, fluorescent fibers and the like. The present invention is intended to provide a further security feature, for objects in general and in particular for value and security documents, which can be used alone or in conjunction with other security features.

SUMMARY OF THE INVENTION

To this end, the present invention provides an object, in particular a value and security document, having a security feature whereby the security feature has the following features:
a) an emitter layer for stimulated optical emission;
b) a spatial periodic modulation, in particular height modulation; and
c) optionally at least one boundary layer adjacent to the emitter layer.

The present invention therefore provides an object having a security feature in the form of a "film laser."

Specifically, a DFB film laser (DFB=distributed feedback) is to be used as a security feature here. A special, albeit per se known, feature of this security feature consists in this laser element's periodic modulation which can extend in one direction or also in two directions.

Film lasers and the like are already known in different variants and for different purposes, but there has hitherto been no suggestion to use such film lasers as security features. An important feature is the abovementioned periodic modulation which can be obtained e.g. by modulation of the emitter layer or the boundary layer. In a preferred embodiment the boundary layer forms a substrate to the surface of which the emitter layer is applied. In a particularly simple way the modulation is formed e.g. as a height modulation by embossing for example a PET substrate. The period length of the predefined modulation permits specific and fine adjustment of the frequency of the laser oscillation.

DE 198 05 993 A1 shows a film laser having a structure which the present invention essentially makes use of. However, no special applications for such a film laser are indicated in the stated print.

With such a film laser, the material of the emitter layer is excited by optical pumping. When the laser threshold is reached and exceeded, laser radiation arises with a wavelength which depends on the modulation period of the modulation, whereby a suitable choice of the modulation period permits fine adjustment of the particular desired laser wavelength.

There are further publications on the topic of "laser film or plastic laser," e.g. in LaserOpto 31 3/1999 p. 21/22; Spektrum der Wissenschaft 10/1999 p. 12 ff. Possible applications for plastic film lasers according to these publications are e.g. high-luminosity flat screens and artistic applications.

DE 198 36 813 A1 discloses a value and security document having optically excitable dye for authenticity testing, whereby a carrier material has dyes embedded therein which together with the carrier material form a laser active element. Although this measure permits a security feature to be formed, this security feature is lacking the inventive peculiarity of a periodic modulation and therefore the possibility of adjusting the wavelength of one or more portions of the security feature to a desired value and thereby permitting a coding which comprises the position and/or the wavelength of a security feature portion.

U.S. Pat. Nos. 5,448,582 and 5,625,456 disclose dye lasers and a few applications for such lasers. The laser effect is based here on scattering effects, so that no directional laser emission is possible. Possible applications are equipping objects with such laser active material and detecting the presence of such material by irradiation with a suitable excitation wavelength.

As mentioned above, a coding can be obtained in the inventive security feature by accordingly adjusting the modulation. The modulation can be effected e.g. by periodic modulation of the refractive index. This is realized for example by a height variation of the emitter layer or a boundary layer. Furthermore, the spatial modulation can also be caused by a periodic variation of the thickness of the emitter layer. Because it is particularly simple to produce, however, a height modulation of the surface of the substrate adjoined by the emitter layer is preferred, whereby an aluminum layer can also be provided as a reflecting layer or mirror plating between substrate and emitter layer to amplify the laser effect.

Two-dimensional application of the periodic modulation permits the desired laser wavelength to be laid out redundantly in the total area of the security feature, but it is also possible to provide the modulation period or several modulation periods in a sequence differing in two directions. Two-dimensional modulation permits the emission characteristics to be adjusted more specifically. Unlike known value and security documents with a laser effect as a security feature, only the inventive use of the modulation permits a coding that makes the security feature particularly valuable.

As per se known, the emission layer of the security feature can have disposed thereon a protective layer with a lower refractive index compared with the emission layer. This guarantees total reflection in the emitter layer even in case of impurities on the surface of the security feature.

For improving the life time of the security feature the invention provides that at least one layer of the security feature is equipped with optical absorbers and/or antioxidants and/or radical traps. Optical absorbers increase the layer stability of the laser active emitter layer. The stated additional substances in one or more layers also increase the stability of the fluorescent properties.

As mentioned above, the periodic modulation allows a simultaneously simple height modulation, obtained e.g. by embossing, and versatile coding of the security feature. The coding can be formed according to the invention in particular by a) defined sites being assigned the state "laser active" or "laser inactive";
b) defined sites being assigned the state "laser inactive" or "laser active with one of a predetermined number of wavelengths"; and/or
c) defined sites each being assigned their own wavelength from a number of possible wavelengths of the laser light or the state "laser inactive."

The simplest type of coding in accordance with the above feature a) permits e.g. the coding of states such as "0" and "1," i.e. a bit-by-bit coding of the security feature. The second type of coding in accordance with feature b) permits an extremely diverse coding. For example, in a matrix-shaped field the intersection points of the matrix can be equipped with laser active elements of different wavelengths and also with laser inactive areas. With three possible laser active states and one laser inactive state and for example 16 matrix intersection points, $4**16 (=4^{16})$ different codings are then possible.

With the third coding possibility c), a field of laser active and laser inactive sites can be so coded that each site is assigned a certain laser wavelength whereby the individual sites are either active or inactive.

The sites of the security feature for the coding can be disposed along a line; they can also be distributed two-dimensionally. For avoiding mutual interference, the sites, i.e. active areas, can have disposed therebetween separating elements e.g. in the form of bars which are laser inactive.

As mentioned above, the inventive security element can be realized very simply. For example it can be formed as the substructure of another security feature, e.g. an embossed hologram. The security feature is then created in the course of the usual production, whereby the formation of the hologram comprises the formation of the periodic modulation.

In a special embodiment of the invention it is provided that the security feature is incorporated into the object in the form of one or more prefabricated portions, in particular in the form of planchets. Such planchets have for example diameters of approx. 0.5 to 5 mm, and are preferably incorporated into paper or applied to the surface thereof. Alternative possibilities for incorporation or application of the security feature into or onto an object involve incorporating or printing small portions of films as pigments in screen printing inks. Film lasers can also be independently produced and glued to the objects to be equipped.

Objects equipped with the inventive security feature can be checked for authenticity by bringing the object with the security feature into the proximity of a pumping light source. This can be in particular a pulsed laser source which supplies enough energy to the security feature for laser operation to start.

However, it is also possible to excite the security feature by electric current. To this end the emitter layer is equipped with electrically conductive layers to which a voltage is applied. In particular, such electrode layers can be the mirror plating formed by an aluminum coating on the substrate side of the emitter layer and a transparent ITO layer on the other side of the emitter layer (ITO: indium tin oxide).

BRIEF DESCRIPTION OF THE DRAWINGS

In the following some embodiments of the invention will be explained in more detail with reference to the drawing, in which:

FIG. 8b shows a spectrum belonging to the security feature according to FIG. 8a.

DETAILED DESCRIPTION OF THE INVENTION

Figures 1, 5:
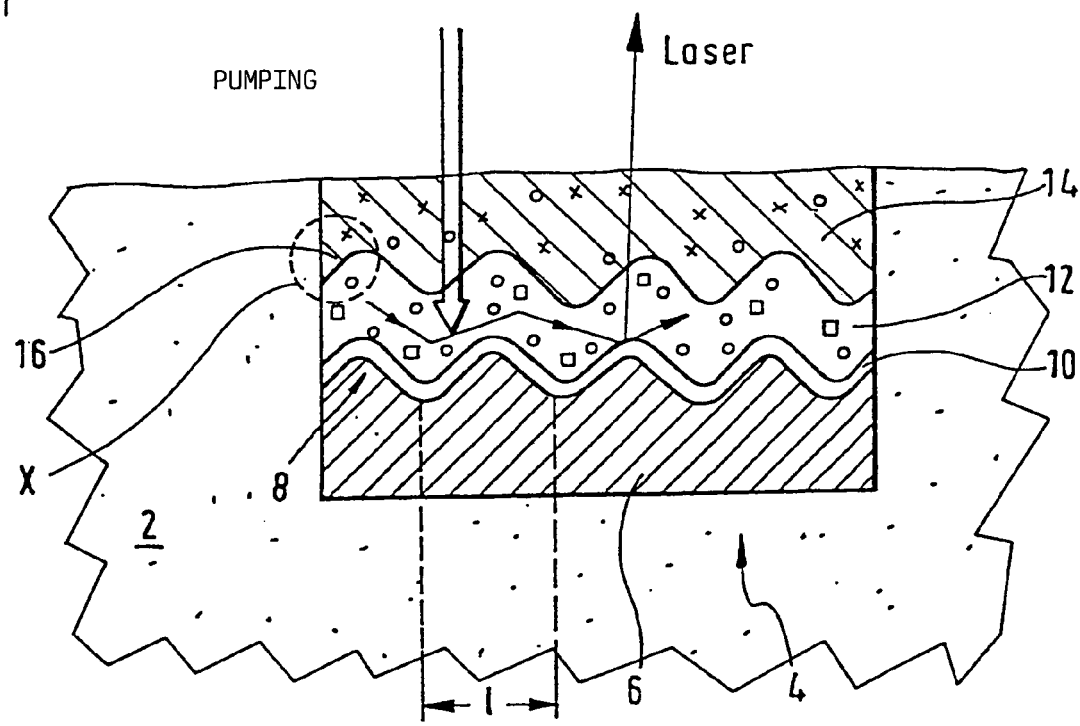
FIG. 1 shows a cross-sectional view through a bank note having a security feature incorporated therein in accordance with the invention.
FIGS. 2, 3, 4 and 5 each show an alternative possibility for the formation of the layers shown in FIG. 1 within the detail "X"

As shown in FIG. 1, a security feature 4 is incorporated into a value and security document present as a bank note 2 here. The fundamental structure of said security feature 4 in the form of a DFB film laser (DFB=distributed feedback) is known, reference being made for example to the abovementioned DE 198 05 993 A1.

The security feature 4 contains a PET substrate 6 (PET: polyethylene terephthalate) having formed on the upper side thereof a height modulation 8 with a period length 1. The height modulation is formed by embossing the PET substrate, as described in detail e.g. in the abovementioned DE 198 05 993 A1.

In the present embodiment the height modulation is formed in only one direction, i.e. from left to right in FIG. 1. It is assumed here that the hills and valleys of the structure of approximately sinusoidal cross section extend with the same cross section into and out of the plane of projection. However, an alternative embodiment is also possible with a periodic height structure in a second direction as well, in particular in a direction perpendicular to the first direction, i.e. a height modulation perpendicular to the plane of projection.

On the surface of the substrate 6 equipped with the height modulation 8 there is an aluminum layer 10 which is e.g. vaporized on the substrate 6 as the reflecting layer or mirror plating.

Above the aluminum layer 10 there is an emitter layer 12. Said emitter layer is so formed that stimulated optical emission of laser light is possible upon corresponding excitation by optical or electric energy. Materials that can be used for the emitter layer are e.g. fluorescent polymers, a polymer layer with embedded laser dyes or inorganic laserable pigments. The upper side of the emitter layer 12 likewise has a height modulation whose modulation period is likewise l, identical with the modulation period 1 of the substrate surface. The height modulation 16 of the emitter layer 12 is adjoined upwardly by a protective layer 14 consisting of a material whose refractive index is lower than that of the emitter layer 12. This guarantees total reflection within the emitter layer even in the case of impurities of the film.

Figure 2:
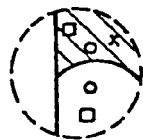
Figure 3:
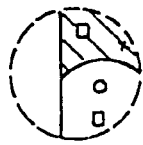
Figure 4:

The emitter layer 12 and the protective layer 14 are provided with several materials that improve the properties for the purpose of a security feature. FIGS. 2 to 4 show the possible alternatives for such substances situated in the layers. FIG. 5 indicates the meaning of the symbols used in FIGS. 1 to 4. For example, according to FIG. 2 the emitter layer 12 contains radical traps (e.g. HALS systems; HALS: hindered amine light stabilizer), as well as antioxidants. The protective layer 14 contains not only the radical traps and antioxidants but also optical absorbers.

FIGS. 3 and 4 show alternative materials for incorporation into the layers 12 and 14.

A peculiarity of the inventive security feature is the periodic modulation of the laser active emitter layer 12. The modulation period 1 of the height modulation 8 has an influence on the wavelength of the laser light emitted by the emitter layer 12 during oscillation buildup of the laser. According to FIG. 1, excitation is effected by irradiation with a pump light source, for example with a pulsed laser. The result of optical pumping is oscillation buildup of the laser active emitter layer 12. The laser light exits for the most part perpendicular to the surface and to the modulation direction of the security feature.

The height modulation 8 can now be varied by varying the modulation period 1 continuously and/or in discrete steps or omitting it in certain sections. In the areas without height modulation there is no laser emission. In the other areas, termed "laser active" here, there is emission of laser light with a wavelength which can be selected within limits by adjusting the modulation period 1.

Upon excitation of the film (consisting in FIG. 1 of the substrate 6 and the superjacent layers) with laser light there is, below the laser threshold, merely a spontaneous emission of the laser dye contained in the emitter layer. At energy above the laser threshold an emission line forms which typically has a width of less than 1 nm. According to FIG. 1 the laser beam exits perpendicular to the surface of the film.

Figure 6:
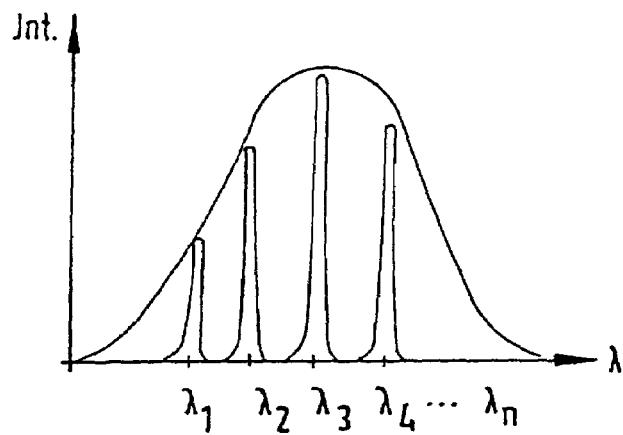
FIG. 6 shows a spectrum of an inventive security feature with peaks present at different wavelengths within an amplification curve of the inventive security feature.

According to FIG. 6 the amplification area shown by the "envelope" contains several possible laser wavelengths which can be adjusted by a corresponding choice of the modulation period 1. The different wavelengths of the laser light permit different film lasers or film laser portions to be distinguished from each other. As mentioned, areas without any modulation are also possible, which are then "laser inactive." A possible number for different discrete wavelengths within the amplification area of the laser is N =20.

Figure 7:
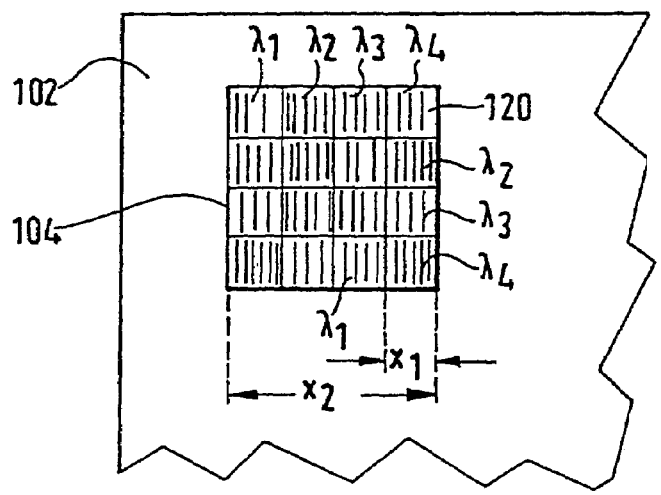
FIG. 7 shows a schematic plan view of a bank note having a matrix-shaped security feature which is coded two-dimensionally.

FIG. 7 shows a possible form of a two-dimensionally coded laser film 104 on a bank note 102. The laser film 104 is formed by a square film element with the edge length X2, comprising 16 square partial elements with the edge length X1. The different 16 elements or portions of the laser film 104 are each assigned one of three different wavelengths $\lambda 1$, $\lambda 2$ and $\lambda 3$. This results in 316 ($=3^{16}$) different coding possibilities for the security element in the form of the laser film as shown in FIG. 7. Adding the possibility "laser inactive" for each of the 16 portions, the result is 416 ($=4^{16}$) coding possibilities.

The laser film 104 shown in FIG. 7 is scanned e.g. with an excitation laser to "read" the wavelengths or the state of the individual portions. To this end a thin laser beam is guided in rows across the four columns of the matrix array. Alternatively, row or column scanning of four portions at a time can be effected with a linear laser beam, whereby signal evaluation is done with the help of a multichannel spectrometer.

It can be seen that instead of the multidimensional matrix form one can also choose a linear form with the states "laser active" for one of several possible laser wavelengths or "laser inactive."

Figure 8A:
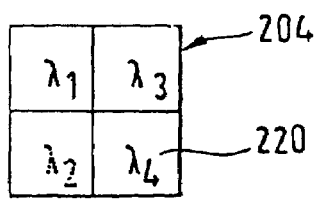
FIG. 8a shows a further embodiment of a security feature in the form of a matrix with fields which can each emit laser light with a wavelength assigned to the field within the matrix.
Figure 8B:
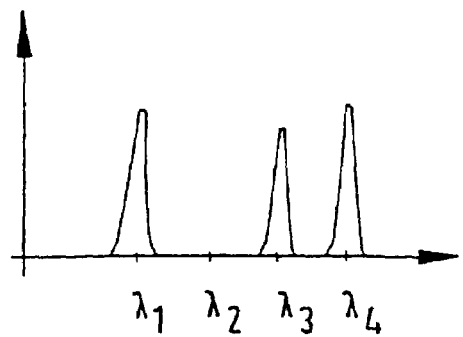

FIG. 8a shows an embodiment of a film laser 204 with four fields 220 each being assigned a certain wavelength $\lambda 1$, $\lambda 2$, $\lambda 3$ and $\lambda 4$. In the embodiment according to FIG. 8a the fields for the wavelengths $\lambda 1$, $\lambda 3$ and $\lambda 4$ are "laser active," the field for the laser wavelength $\lambda 2$ "laser inactive." Evaluation of the film laser excited to laser emission by excitation light results in an intensity spectrum according to FIG. 8b.

Not shown in FIGS. 7 and 8a is the special feature of providing separating areas between the individual portions of the matrix array to prevent mutual influence of the laser wavelengths upon reading of the coding.

In a further embodiment, electric energy can be used for exciting the emitter layer 12 instead of pumping light in accordance with FIG. 1. For example, the aluminum layer 10 which functions as a mirror plating can be formed at the same time as an electrode to which one pole of a voltage source is connected. In the area of the height modulation 16 between the layers 12 and 14 a transparent ITO layer can be provided which is connected to the other pole of the voltage source if laser oscillation is to be built up. It is also possible to use two metal electrodes with a hole or grid structure which are permeable to the exiting laser light.

Alternatives to the above-described embodiments have already been mentioned. It is thus possible e.g. to provide a modulation of the refractive index of the emitter layer instead of the height modulation of the substrate. The modulation is important for obtaining a certain laser wavelength or several certain laser wavelengths to permit a coding.

The invention claimed is:

1. A value and security document, comprising a security feature having a substrate, an emitter layer for stimulated optical emission and a periodic height modulation formed on a surface of the substrate.

2. A value and security document according to claim 1, wherein the periodic modulation extends in a single direction.

3. A value and security document according to claim 1, wherein the periodic modulation extends in two different directions.

4. A value and security document according to claim 3 wherein said two different directions extend at right angles to each other.

5. A value and security document according to claim 1, wherein a reflecting layer is located between the substrate and the emitter layer.

6. A value and security document according to claim 1, wherein the emitter layer has disposed thereon a protective layer with a lower refractive index compared with the emitter layer.

7. A value and security document according to claim 1, wherein the emitter layer is equipped with at least one of optical absorbers, antioxidants, and radical traps.

8. A value and security document according to claim 1, wherein the security feature comprises a coding, whereby the coding is formed by at least one of:
   a) defined sites being assigned a state "laser active" or "laser inactive;"
   b) defined sites being assigned a state "laser inactive" or "laser active with one of a predetermined number of wavelengths;" and
   c) defined sites each being assigned their own wavelength from a number of possible wavelengths of the laser light or a state "laser inactive."

9. A value and security document according to claim 8, wherein the sites are disposed along a line.

10. A value and security document according to claim 9, wherein the sites are disposed in two dimensional distribution.

11. A value and security document according to claim 8, wherein separating elements are formed between the sites.

12. A value and security document according to claim 1, wherein the security feature is formed as the substructure of another security feature.

13. A value and security document according to claim 12 wherein said another security feature is a hologram.

14. A value and security document according to claim 1, wherein the security feature is incorporated into the object in the form of one or more prefabricated portions.

15. A value and security document according to claim 14 wherein said prefabricated portions are planchets 16. A value and security document according to claim 1, wherein the security feature is provided on the object by means of screen printing or glued to the object as a prepared element.

17. A value and security document according to claim 1, wherein the emitter layer has a protective layer disposed thereon that is equipped with at least one of optical absorbers, antioxidants and radical traps.

* * * * *